US012597372B2

(12) United States Patent
Knight

(10) Patent No.: US 12,597,372 B2
(45) Date of Patent: Apr. 7, 2026

(54) NOVELTY DISPLAY PLATFORM

(71) Applicant: Aisha Ruth Knight, Laguna Niguel, CA (US)

(72) Inventor: Aisha Ruth Knight, Laguna Niguel, CA (US)

(73) Assignee: Aisha Ruth Knight, Laguna Niguel, CA (US)

( * ) Notice: Subject to any disclaimer, the term of this patent is extended or adjusted under 35 U.S.C. 154(b) by 138 days.

(21) Appl. No.: 18/420,522

(22) Filed: Jan. 23, 2024

(65) Prior Publication Data

US 2024/0161663 A1 May 16, 2024

Related U.S. Application Data

(63) Continuation-in-part of application No. 17/831,758, filed on Jun. 3, 2022, now Pat. No. 11,908,348.

(51) Int. Cl.
*G09F 13/04* (2006.01)
*G09F 13/36* (2006.01)

(52) U.S. Cl.
CPC ...... *G09F 13/0404* (2013.01); *G09F 13/0456* (2021.05); *G09F 13/0481* (2021.05); *G09F 13/36* (2013.01)

(58) Field of Classification Search
CPC ............. G09F 13/0404; G09F 13/0456; G09F 13/0481; G09F 13/36
See application file for complete search history.

(56) References Cited

U.S. PATENT DOCUMENTS 5,416,994 A * 5/1995 Mclaughlin ............. G09F 13/24 40/406
5,967,639 A * 10/1999 Shih .......................... F21V 9/12 362/101
10,433,666 B1 * 10/2019 Jovanov ............. B65D 43/0202
11,629,841 B1 * 4/2023 Massoni ................. G09F 13/04 362/414
2002/0073585 A1 * 6/2002 Burnett ................... G09F 13/24 40/406
2002/0118531 A1 * 8/2002 Yang ....................... A63J 17/00 362/86
2005/0201081 A1 9/2005 Brady
2006/0133064 A1 * 6/2006 Lin ....................... F21S 10/002 362/101
2009/0255155 A1 * 10/2009 James ..................... G09F 19/02 40/406

(Continued)

FOREIGN PATENT DOCUMENTS

WO 2019/118467 A1 6/2019

*Primary Examiner* — Gary C Hoge
(74) *Attorney, Agent, or Firm* — Irell and Manella LLP

(57) ABSTRACT

The NOVELTY DISPLAY PLATFORM discloses a display platform for illuminating a display chamber. The platform includes a base unit containing a light source. The base unit is configured with a stage to support a display chamber. The base unit further includes an opening configured to receive a light conduit. The light conduit is configured to redirect light from the light source contained in the base unit to illuminate the display chamber. The display chamber may contain a transparent sheet bearing an image and/or be filled with a suspension of reflective particles. The light source may be color changing and/or support various display modes, and may be controlled by a remote.

19 Claims, 11 Drawing Sheets

(56) References Cited

U.S. PATENT DOCUMENTS

| | | | | |
|---|---|---|---|---|
| 2010/0276508 | A1* | 11/2010 | Davies | F21V 23/0435 239/18 |
| 2016/0010819 | A1* | 1/2016 | Yang | F21S 6/002 362/101 |
| 2016/0186939 | A1* | 6/2016 | Ho | F21V 17/104 362/101 |
| 2017/0011672 | A1* | 1/2017 | Chakravartula | G09F 13/24 |
| 2018/0231233 | A1* | 8/2018 | McGuire | F21V 23/0435 |
| 2021/0060450 | A1 | 3/2021 | Guarino | |
| 2021/0065592 | A1* | 3/2021 | Sharp | G09F 27/00 |

* cited by examiner

FIG. 11
FIG. 10
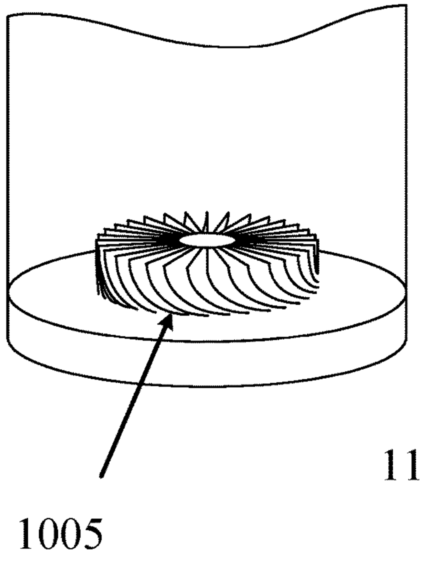
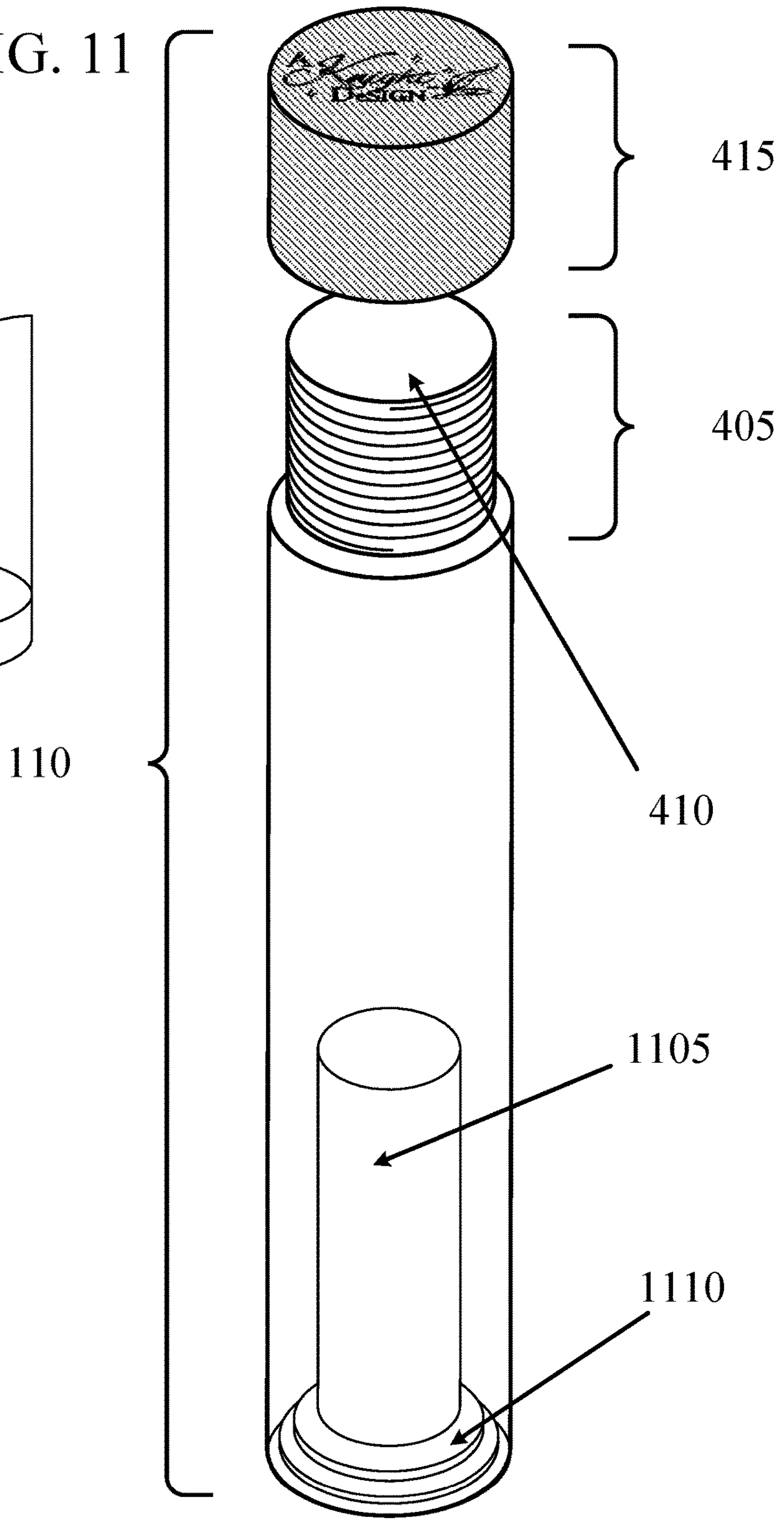

NOVELTY DISPLAY PLATFORM

PRIORITY CLAIM AND RELATED APPLICATIONS

This application is a Continuation-In-Part of and claims priority under 35 U.S.C. § 120 to co-pending U.S. non-provisional patent application Ser. No. 17/831,758 entitled, "Novelty Display Platform," filed Jun. 3, 2022, the entire contents of which are hereby incorporated herein by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations address novelty displays, including novelty lamps for illuminating an image for display.

BACKGROUND

Lamps and illuminated displays have been developed to serve various purposes, such as illumination and decoration. Some lamps focus to a greater degree on providing practical illumination, for example as a nightlight where only minimal illumination is required. Others serve a primarily decorative purpose, such as by illuminating colored globules in an immiscible combination of liquids in novelty lamps colloquially termed "lava lamps." The lamps generally draw power from a wall outlet, but may also be powered by battery, or by other power sources.

SUMMARY

Embodiments of the present innovations relate to novelty display platforms for illuminating a display chamber. In some implementations, the display platform may comprise a base unit containing a light source and providing a stage for supporting a display chamber. The base unit may be further configured to receive a light conduit that redirects light from inside the device base unit to illuminate the display chamber. Both the display chamber and light conduit may integrate and/or combine with the base unit. Various implementations of the display chamber may contain a transparent sheet including one or more images, e.g., with at least some portions permeable to light, so that the image is effectively illuminated from behind, and is thus well visible through the far side of the display chamber. In other implementations, the display chamber may contain sculptural elements for display. Such sculptures may in some embodiments be transparent and amendable to being illuminated, e.g., from the rear, edge-lit, and/or the like during display. Other embodiments may accommodate opaque display media by directing illumination toward the display chamber from the front or sides. In some implementations, display chambers are not integrated with the base unit, so that the base unit and light conduit can illuminate a variety of display chambers each containing a different image for display by removing one display chamber from the stage and replacing it with another. In some implementations, the front of the base may be equipped to mount interchangeable plaques, such as to bear logos corresponding to the images in display chambers. Additionally in some embodiments, the light conduit may comprise an acrylic light-diffusing panel configured to evenly illuminate a display chamber with diffuse light, e.g., via a frosted region. In various implementations, the light source in the base may allow for variable lighting effects, such as color changing, dimming, strobe effects, ultraviolet illumination, and/or the like, which effects may be remotely controllable, for example via a mobile phone, external and/or remote computing device, and/or the like. In various implementations, various mechanical features may be implemented to change the display, such as by rotating the display chamber and/or an ornamental feature.

BRIEF DESCRIPTION OF THE DRAWINGS

The accompanying appendices and/or drawings illustrate various non-limiting, example, innovative aspects in accordance with the present descriptions:

FIG. 10 is a partial perspective drawing of a cylindrical display chamber with a turbine, according to some embodiments disclosed herein.

FIG. 11 is a perspective drawing of a cylindrical display chamber containing a turntable and an inner chamber, disassembled to show the cap and chamber separately, according to some embodiments disclosed herein.

DETAILED DESCRIPTION OF DRAWINGS

Figure 1:
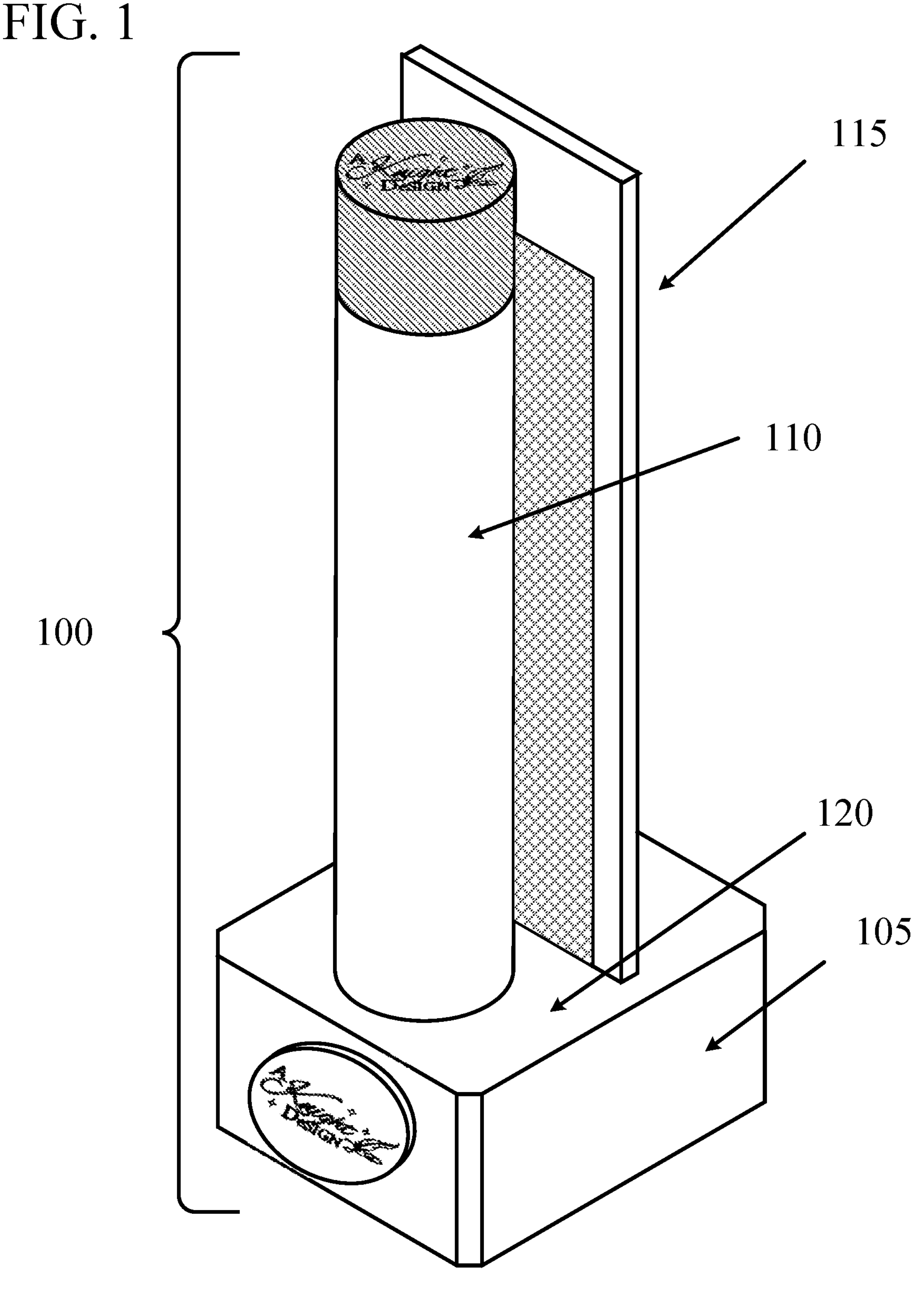
FIG. 1 is a perspective drawing of an assembled display platform including a base unit, cylindrical display chamber and light conduit comprising a light diffusing panel according to some embodiments disclosed herein.

FIG. 1 illustrates an embodiment of the display platform 100 that includes a base unit 105 containing a light source 1735, a display chamber 110, and a light conduit 115. In this embodiment, the light conduit comprises a light diffusing panel 115 that slots into and stands, e.g., substantially perpendicular, to the top panel 120 of the base unit 105. In some implementations, the top panel 120 may serve as a stage on which the display chamber 110 stands. Other embodiments comprise a base unit 105 configured to interface with a display chamber 110 and light conduit 115 even if not actually integrated or combined with the display chamber or light conduit.

Figure 2:
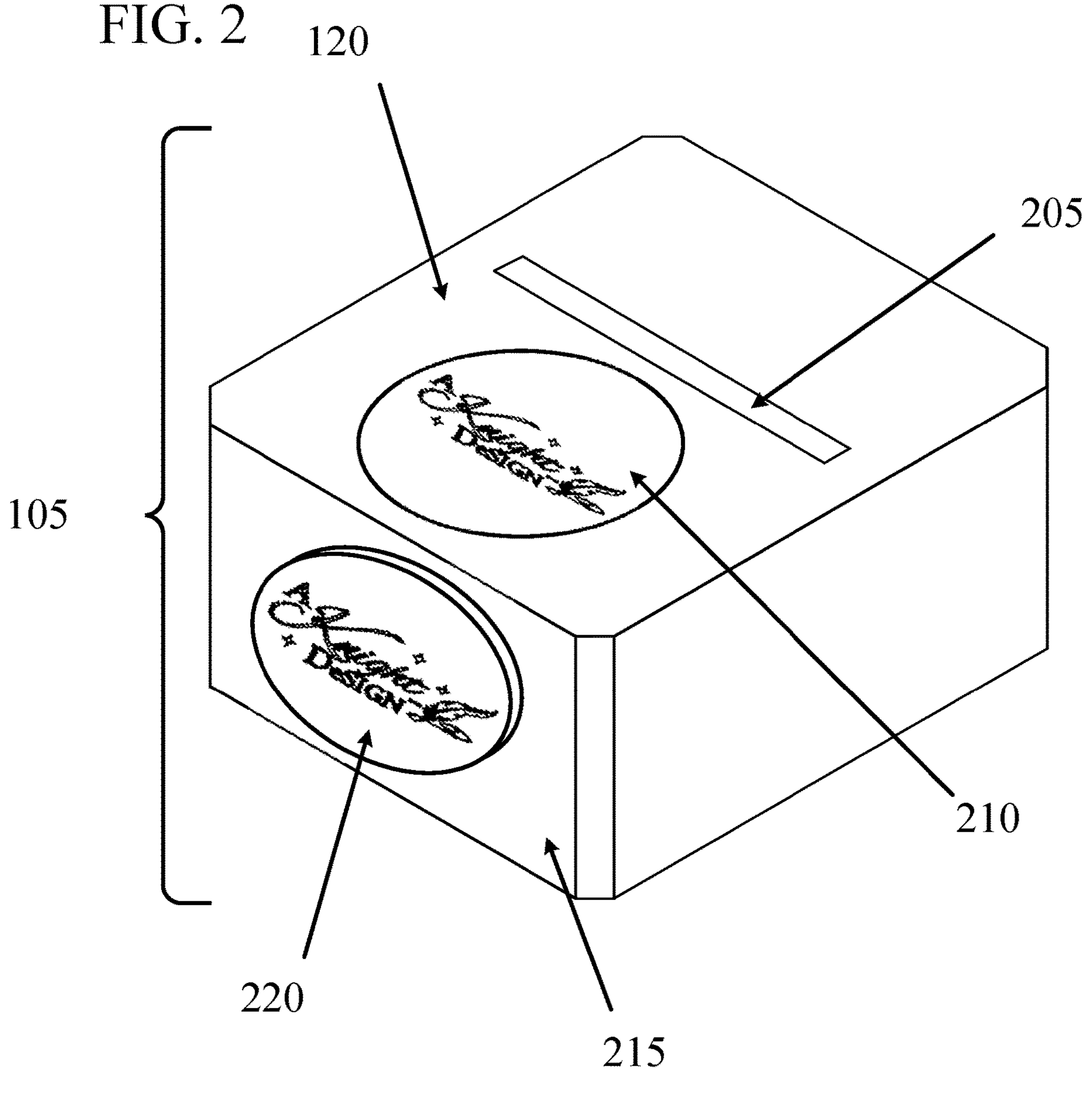
FIG. 2 is a perspective drawing of a base unit alone, according to some embodiments disclosed herein.

FIG. 2 illustrates the base unit 105 separately in one embodiment. In some implementations, the base unit 105 may comprise a hollow right prism of a rectangle with its corners cut off, although numerous other shapes and/or sizes may be employed according to other implementations. The base unit 105 may contain a light source 1735, such as a colored light-emitting diodes which may be controlled, e.g., by remote in a particular implementation. Many other light sources 1735 could be used: with varying modes of illumination, incandescent, fluorescent and/or the like; in various color schemes, monochromatic, statically or dynamically multicolored, ultraviolet illumination, and/or the like; and controlled in various ways, by buttons electrically connected to the light source 1735, touch pad, touch screen, voice activation, clap activation, mobile phone control, pre-programmable and/or user-programmable light sequences, and/or the like. In some implementations, the light source 1735 may comprise a projector configured to project one or more images on a screen provided within the display chamber. Such images may, for example, be provided stored in a digital memory (e.g., a USB drive) and/or may be replaceable. The top panel 120 includes an opening 205 configured to receive a light conduit 115. In one implementation, the opening 205 is an elongated slot. In one implementation, a portion of the top panel 120 may serve as a stage for standing a display chamber. For example, an etched circle 210 may mark the position to stand a display chamber 110 in this implementation, or top of the base unit 105 may have a curved channel configured to receive a cylindrical display chamber lying on its side. In other implementations, the display chamber 110 may interface with the base unit 105 in different ways. For example, the base unit 105 and display chamber 110 may be configured to couple mechanically one to the other, may be configured to be held together by magnetic attraction, e.g., via one or more magnets in the base unit 105 and/or display chamber 110, and/or the like.

In one implementation, the front panel 215 may include a plaque 220 that bears a logo. The plaque 220 may include one or more magnets configured to attach to the front panel 215 by magnetic attraction, for example by including corresponding magnets in or on the front panel 215, or by making a portion of the front panel 215 out of a ferromagnetic material. The plaque may attach to the front panel 215 in a variety of different ways, for example a peg on its back configured to fit in a hole included on the front panel 215. A feature of this configuration is that the front plaque 220 is exchangeable for other plaques, e.g., to correspond to the various themes of the interchangeable display chambers 110. In other implementations, the base unit 105 may include an aroma release facility (e.g., a heating element and aroma source container to release aromas by essential oil diffusion, melting aromatic wax, and/or the like), sound effects, alarms, music playback, and/or the like. These effects may or may not be synchronized or coordinated in various ways with the illumination of the, e.g., patterns of flashing light corresponding to the beat of music.

Figure 3:
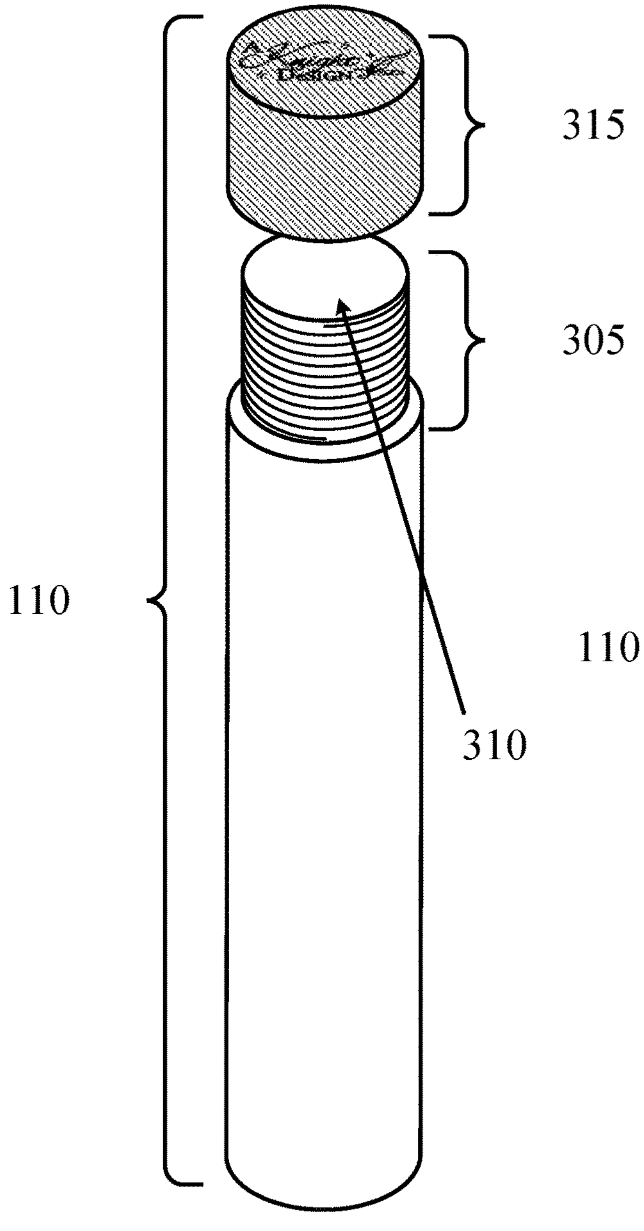
FIG. 3 is a perspective drawing of a cylindrical display chamber, disassembled to show the cap and chamber separately, according to some embodiments disclosed herein.

FIG. 3 is a perspective drawing of a cylindrical display chamber 110. In one embodiment, the display chamber 110 is a cylinder with a threaded portion 305 at one end (e.g., the top) that is necked-down. The top end may also have an opening 310 where the top side of a cylinder would be. In this embodiment, a screw-on cap 315 is affixed via the threaded portion 305. The cap 315 may be etched with a logo or other image on its top surface, or may have a plaque attached to the top surface. The display chamber 110 may take a variety of other shapes and/or sizes in different embodiments, for example elongated rectangular prisms, cubes, spheres, conical or modified conical shapes, and/or the like. In some implementations, the display chamber 110 may be filled with a mixture of water and a thickening agent such as polyvinyl alcohol. The fluid may further contain glitter, sequins, and/or similar reflective or non-reflective particles, including in shapes made to match a particular theme, which may be put into suspension by shaking the display chamber 110. The viscosity of the fluid may be modulated by using various concentrations of polyvinyl alcohol or other thickening agents, which may have various advantages, e.g., higher viscosity fluids holding particles in suspension for longer. Additionally, glitter particles and/or the like may be kept in suspension by a stirring and/or vibration feature in the base unit 105, by a magnetic stir bar 910 in the display chamber 110 moved by a rotating magnetic field from the base unit 105, and/or the like. In other embodiments, the display chamber 110 may be filled with water alone, a dyed aqueous mixture, other liquid, air, other gasses or fluids, and/or the like. In some implementations, the display chamber 110 is colorless and transparent to allow an image 505 to be viewed through the side of the chamber. Such a display chamber 110 may be made out of plastic, glass, or other transparent or semi-transparent materials.

Figure 4:
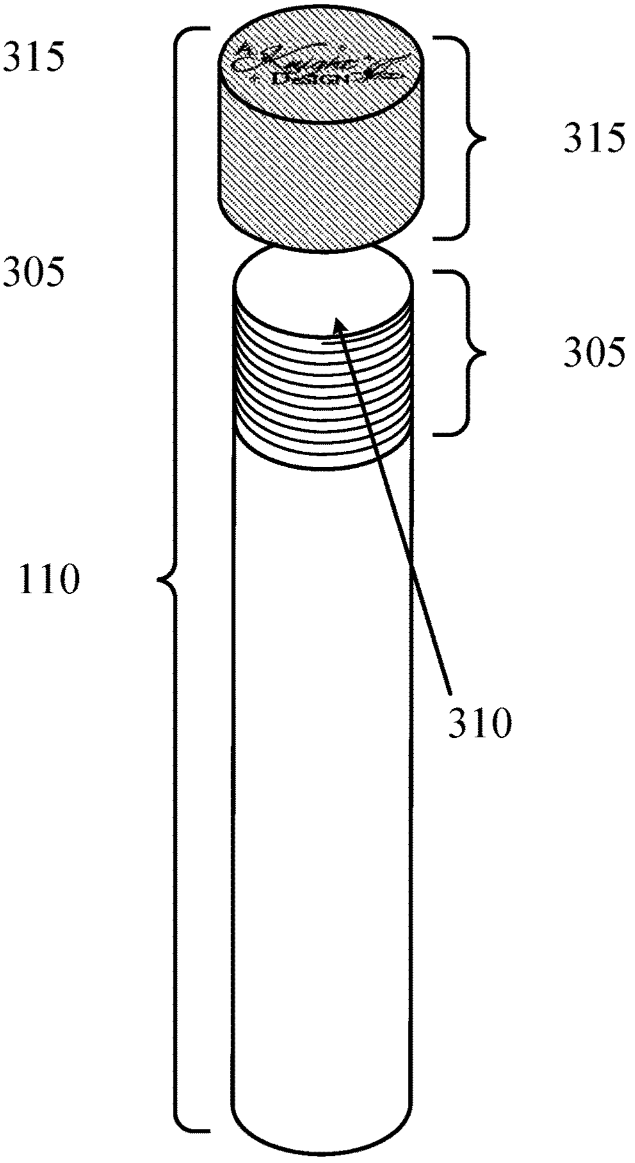
FIG. 4 is a perspective drawing of a wide-mouth cylindrical display chamber, disassembled to show the cap and chamber separately, according to some embodiments disclosed herein.

FIG. 4 is a perspective drawing of a cylindrical display chamber 110 in accordance with another embodiment. In the depicted embodiment, the display chamber 110 is a cylinder with a threaded portion 305 at one end (e.g., the top), wherein the threaded portion is not necked-down. Accordingly in this embodiment the opening 310 may be as wide as the widest part of the display chamber, facilitating the insertion of an ornamental element that can fill the entire width of the display chamber, without the need to deform the ornamental element on insertion. A screw-on cap may be affixed via the threaded portion 305. The display chamber 110 in a variety of other shapes and/or sizes in different embodiments may also be provided with a wide mouth opening. For example elongated rectangular prisms, cubes, spheres, conical or modified conical shapes, and/or the like may have openings substantially the same width as their respective widest points, which may also allow an ornamental element to be inserted without deformation.

Figure 6:
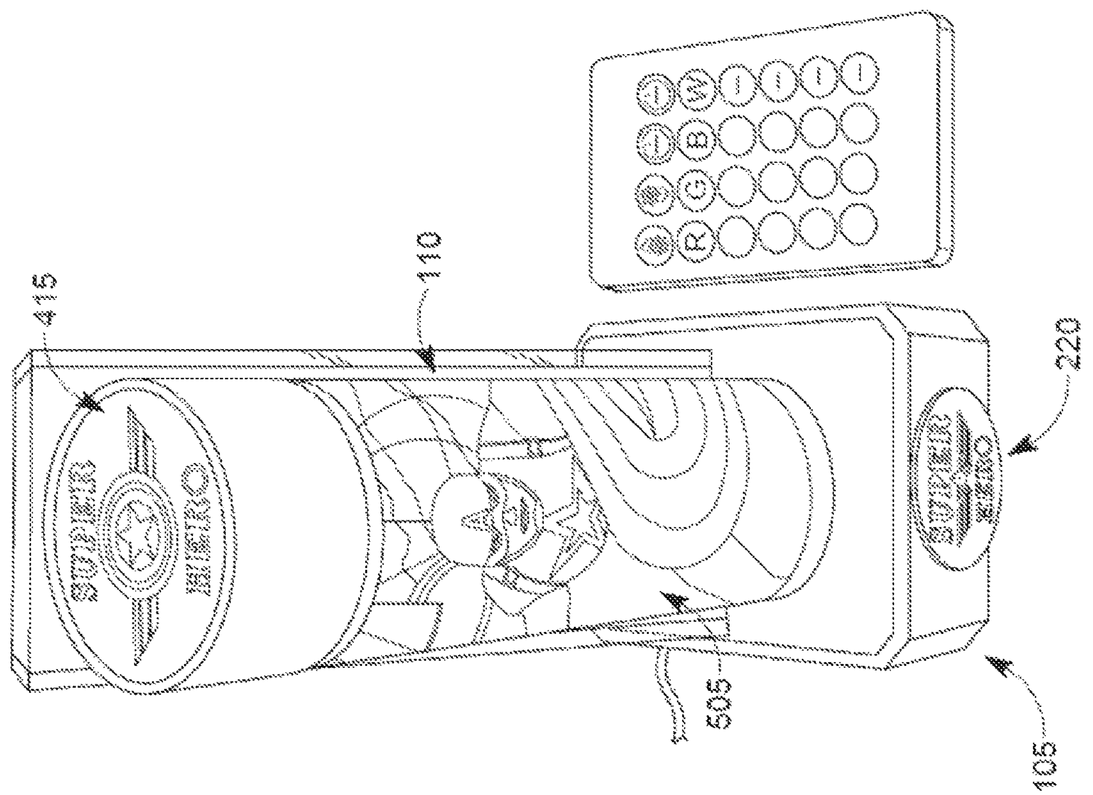
FIG. 5 and FIG. 6 are drawings of an embodiment of an assembled display platform with an image for display alongside a remote control.
Figure 5:
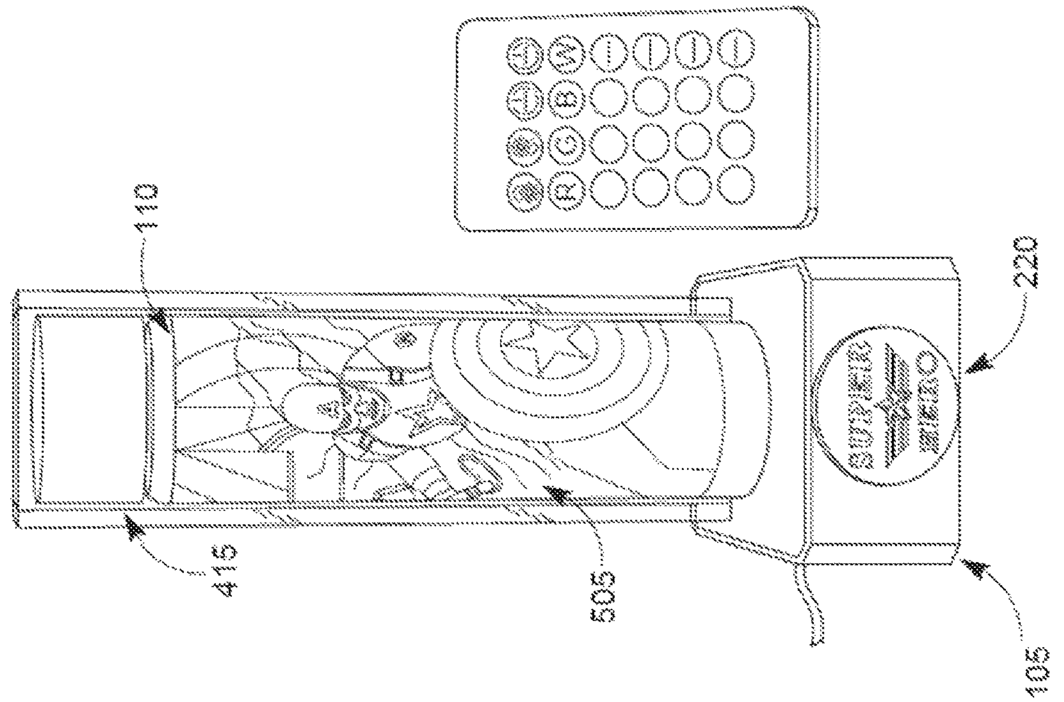

In one implementation, a transparent or semi-transparent sheet bearing an image 505 may be contained within the display chamber 110. The transparent sheet or other ornamental element may be pliable to allow insertion, e.g., in embodiments with necked down openings. The image may be arranged on the transparent sheet to be viewed in landscape orientation, portrait orientation, or arranged in any other way. The transparent sheet may take a variety of shapes and be configured to be inserted into the display chamber 110 in a variety of orientations. The image 505 may be in multiple colors, including colored transparent or semi-transparent portions, to allow the image 505 to be illuminated for display from behind with light passing through some or all of it. In this embodiment, the portion of the display chamber 110 wall opposite to this image 505 is transparent and colorless to allow the image to be viewed through the display chamber 110. In one embodiment, the display chamber 110 may remain un-attached to the base unit 105. A feature of this embodiment is that display chambers 110 with different images 505 may be exchanged on the display chamber stage. The image 505 may be produced by various techniques and in various media. For example, the image 505 may be laser cut out of a metallic medium, laser cut out of other media, printed in ink on the transparent sheet, printed as a lenticular image that appears to transform as the viewing angle changes or as a holographic print giving an illusion of three dimensions, and/or the like. One example of a display platform 100 arranged in this way is depicted in FIGS. 5 and 6.

In another implementation, an image 505 may be printed or otherwise produced directly on the surface of the display chamber 110. In different embodiments, a display platform 100 could illuminate images from other directions, using other types of light conduit 115, such as to illuminate opaque images as well. In other implementations, the display chamber 110 may be colored, partially opaque or semi-transparent, patterned, and or the like. In other embodiments, the display chamber 110 may attach to and/or be integral to, the base unit 105, such as to provide stability. In yet another embodiment, the display chamber 110 may contain a sculpture or figurine in addition to, or instead of an image. Such a sculpture or figurine may be illuminated, e.g., from the rear, edge-lit, and/or the like in various implementations. In some implementations, the display chamber 110 may carry electronic identification, e.g., a passive or active Radio-Frequency Identification (RFID) tag, barcode, matrix barcode, and/or the like, which the base unit 105 may be equipped to read. This may allow computing components in the base unit 105 to detect when a particular display chamber 110 is on the top panel 120. This may trigger the base unit 105 to engage some of its functions automatically when a display chamber 110 is placed on it and/or brought into close proximity, e.g., a preprogrammed light display, music playback, other sounds, and/or the like.

Figure 7:
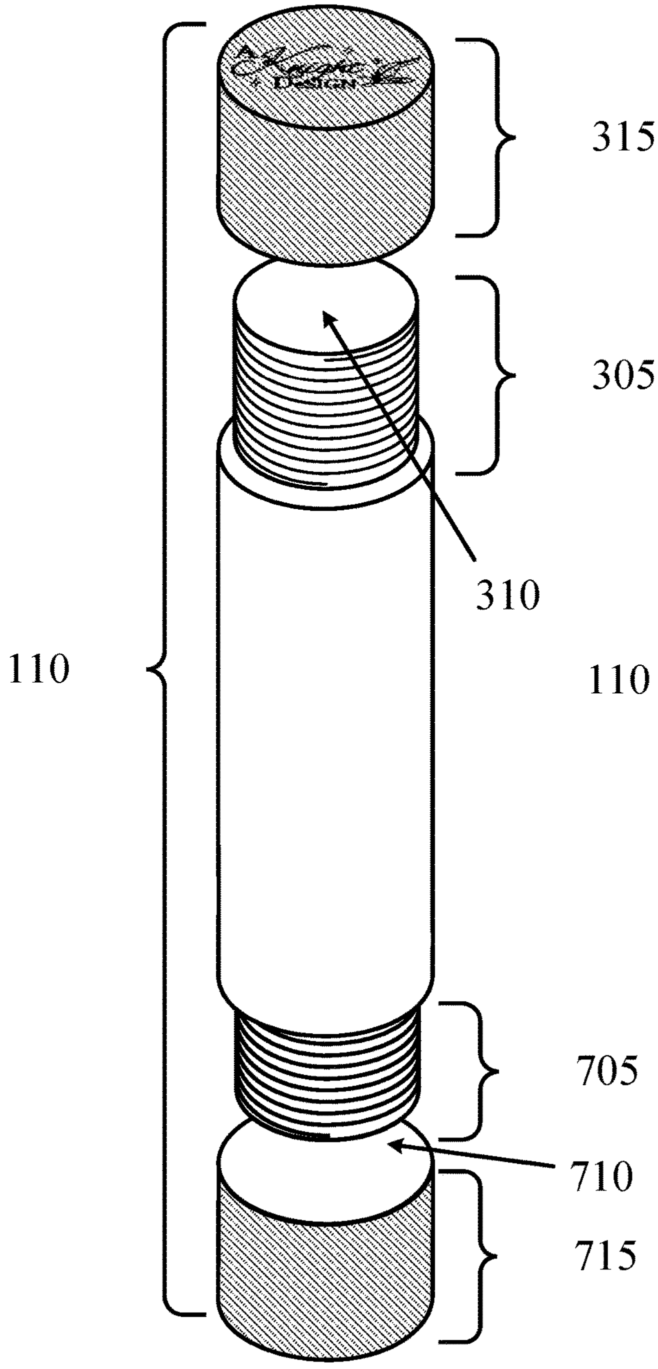
FIG. 7 is a perspective drawing of a cylindrical display chamber opening at both top and bottom, disassembled to show the caps and chamber separately, according to some embodiments disclosed herein.

FIG. 7 is a perspective drawing of a cylindrical display chamber 110 according to another embodiment. The display chamber 110 may be cylindrical with, e.g., a necked-down and threaded portion 305 at the top end with an opening 310 and a cap 315. In addition, it may have another threaded portion 705, which may also be necked down, at an opposite end. The opposite end may have another opening 710 and a screw-on cap 715. The display chamber 110 may additionally open at opposite ends when it takes one of a variety of other shapes and/or sizes in different embodiments, for example elongated rectangular prisms, cubes, spheres, conical or modified conical shapes, and/or the like.

Figure 8:
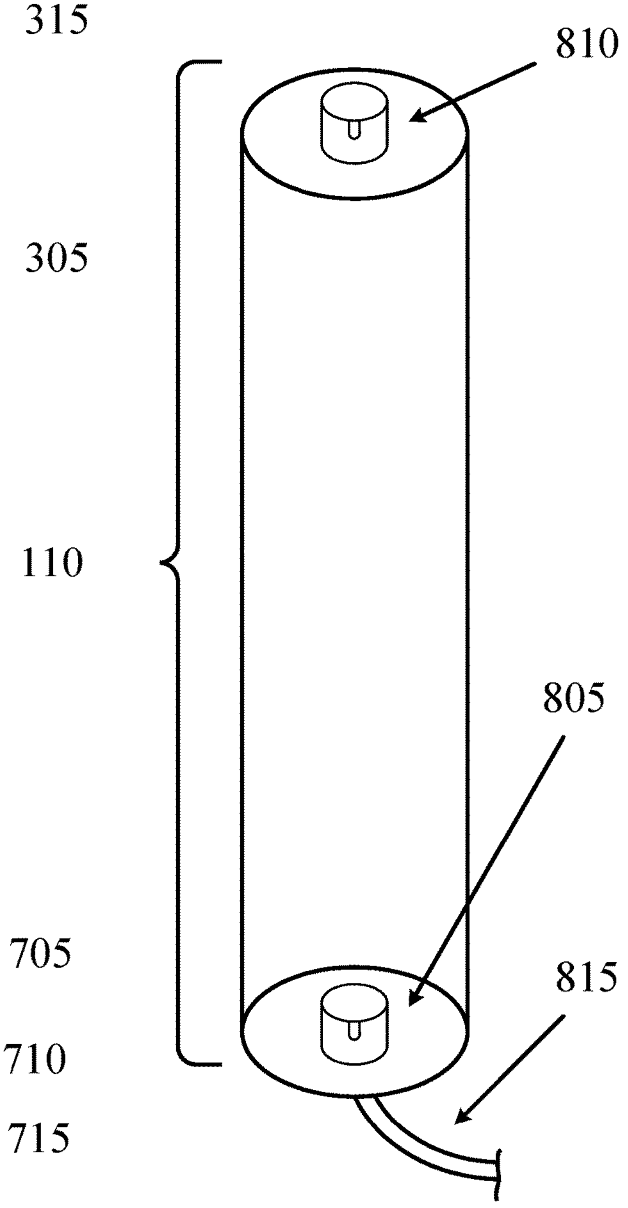
FIG. 8 is a perspective drawing of a cylindrical display chamber with valves, according to some embodiments disclosed herein.

FIG. 8 is a perspective drawing of a cylindrical display chamber 110. In the depicted embodiment, the display chamber 110 is a cylinder with a first one-way valve 805 allowing fluid flow into the display chamber 110, e.g., across the bottom side of the cylinder, and a second one-way valve 810 allowing flow out of the display chamber 110, e.g., across the top side of the cylinder. The bottom valve may be attached to a length of tubing 815. In some implementations, air may be pumped through the length of tubing 815, such as to create a stream of bubbles in the liquid in the display chamber 110. In other implementations, one or more fluids may be pumped through the length of tubing 815 to establish a flow of fluid through the display chamber, such as to agitate particles suspended therein. A similar arrangement of a first one-way valve 805 and a second one-way valve 810 may be implemented in display chambers 110 of other shapes, for example elongated rectangular prisms, cubes, spheres, conical or modified conical shapes, and/or the like.

Figure 9:
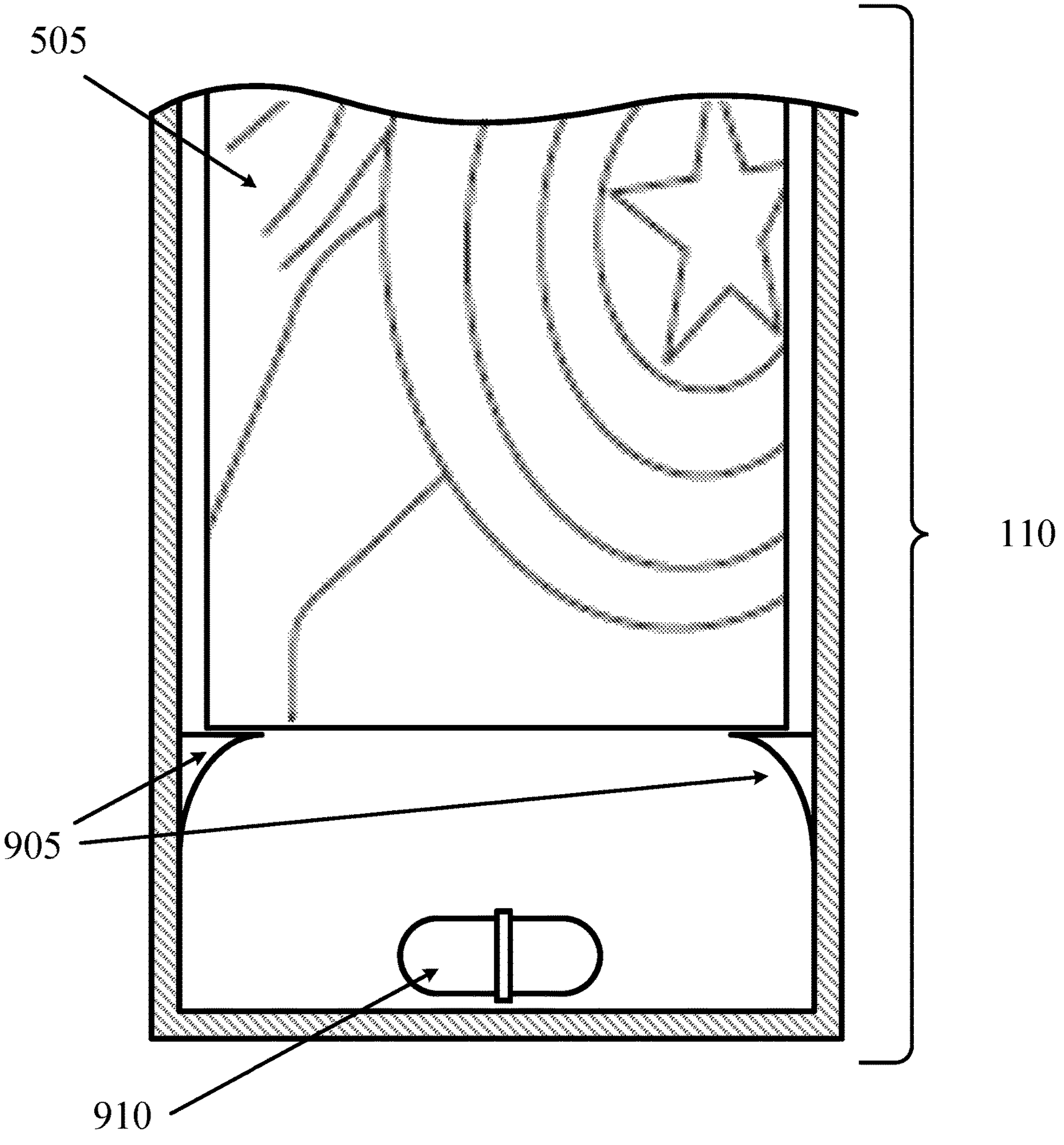
FIG. 9 is a partial drawing of a cylindrical display chamber with shelves for supporting an ornamental sheet and a magnetic stir bar, according to some embodiments disclosed herein.

FIG. 9 illustrates a cross sectional view of the lower portion of a display chamber 110. In certain embodiments, one or more shelves 905 may protrude from the sides of the display chamber 110 on which the transparent sheet bearing an image 505 (or another medium for display) can rest near or above the bottom of the display chamber 110. In other embodiments, slots may be provided on one or more interior surfaces of the display chamber, configured to accommodate the insertion of display media, such as a transparent sheet bearing an image. One or more shelves and/or slots may, in some embodiments, provide clearance for a magnetic stir bar 910 other spinning element to be introduced on the bottom of the chamber. For example, a turbine 1005 may be included on the bottom of the display chamber 110 as shown in FIG. 10. This spinning element may serve to agitate the aqueous mixture in the display chamber and thereby maintain the particulates in suspension while the spinning implement is driven to spin, instead of requiring repeated manual agitation. The stir bar 910 may, for example, be rotated by a permanent magnet 1755 installed in the base unit and attached to an electric motor. That motor may rotate the magnet 1755, which may create a rotating magnetic field, and which may drive the stir bar 910 to rotate. Alternatively, a rotating magnetic field may be created or approximated by electromagnets in the base unit 105 being turned on an off in a set pattern, which can drive the stir bar 910 to rotate in a similar manner. Alternatively, in an embodiment with a turbine 1005 installed in the base of the display chamber 110, the turbine 1005 may be driven by an electric motor. The motor may, in one implementation, be powered via an inductive element in the display chamber from an inductive element 1750 in the base unit. The motor may also be powered by a battery 1740 in combination with inductive charging or without it, or may be powered by any other known technique for providing electrical power.

FIG. 11 is a perspective drawing of a cylindrical display chamber 110. In the displayed embodiment, the display chamber 110 contains an inner chamber 1005. In one implementation, the inner chamber may rest on top of a turntable 1110. The turntable 1110 may be rotatable, such as by an electric motor. In some implementations, the display chamber 110 may be filled with a mixture of water and a thickening agent such as polyvinyl alcohol, while the inner chamber 1005 may be filled with a different fluid, such as air or another gas or liquid. The inner chamber 1005 may be made out of plastic, glass, or other transparent or semi-transparent materials, and it may contain an ornamental sheet, sculpture, or other ornamental feature. In other embodiments, a turntable 1110 may be implemented without an inner chamber 1005, or an inner chamber 1005 may be implemented without the turntable 1110.

Figure 12:
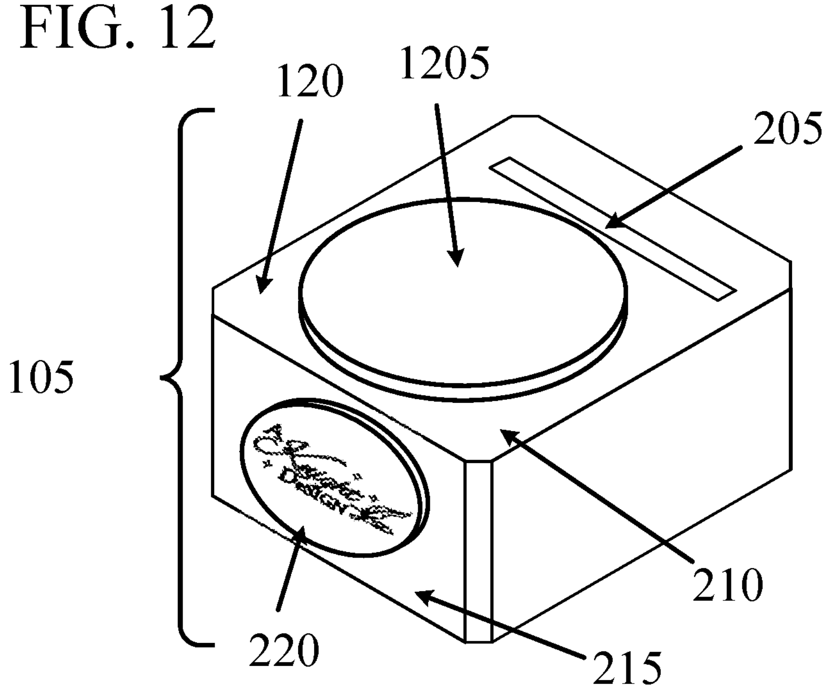
FIG. 12 is a perspective drawing of a base unit alone with a rotating display chamber stage, according to some embodiments disclosed herein.

FIG. 12 is a perspective drawing of a base unit 105 according to another implementation. The base unit may be additionally equipped with a rotating platform 1205 on its top panel 120, which may comprise all or a portion of the display stage 210. The rotating platform 1205 may be configured to support a display chamber 110. The rotation of the platform 1205 may be driven in certain embodiments, such as by an electric motor located in the base unit. In some implementations, the base unit may be adorned with a graphic image, etching, and/or the like (e.g., etched with an image matching an image or theme associated with an image presented within the display chamber).

Figure 13:
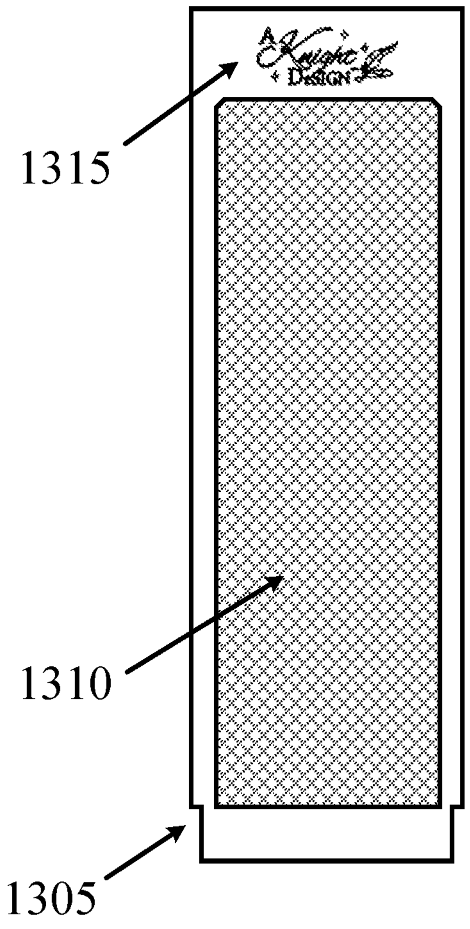
FIG. 13 depicts the front face of a light conduit comprising a light diffusing panel with an etched logo, according to some embodiments disclosed herein.
Figure 14:
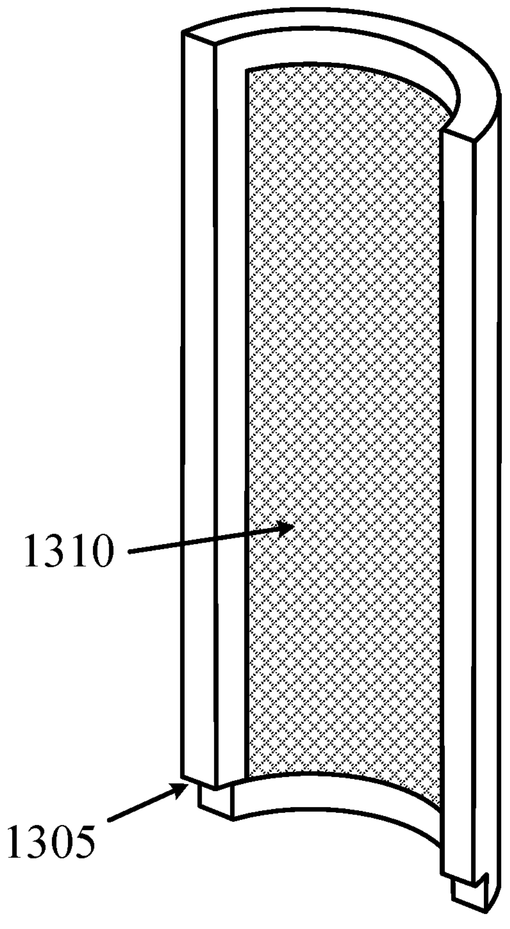
FIG. 14 is a perspective drawing of a light conduit comprising a curved light diffusing panel, according to some embodiments disclosed herein.

FIG. 13 illustrates a light conduit 115 separately in one embodiment. According to one implementation, the light conduit 115 may comprise a light-diffusing panel, such as in the shape of an elongated rectangle with the bottom portion 1305 narrowed so that the light-diffusing panel may be inserted into a slot 205 in the base unit 105 up to the point that the panel narrows and thereby stand perpendicular to the base unit's 105 top panel 120. In some implementations, some or all of the light conduit 115 may include a frosted area 1310. For example, a frosted area 1310 may cover most of the light-diffusing panel's area in some implementations. The frosted area 1310 may be configured to provide substantially even diffuse lighting when the light-diffusing panel is lit from an edge. In some embodiments, a frosted area 1310 configured to provide even illumination may be implemented by laser etching and/or engraving in acrylic. During operation in such implementations, the light-diffusing panel may be illuminated, e.g., from its bottom edge by the light source 1735 within the base unit 105, and may redirect light from the light source 1735 to diffusely illuminate a display chamber 110. According to some embodiments, a logo 1315 may be etched into the light conduit. In some implementations, this etching may be configured to illuminate more strongly than an unetched surface of the panel when lit from the edge, causing the etched logo 1315 to stand out visually when the panel is in use as a light conduit 115. In alternative implementations, light conduits 115 in other shapes or with other optical properties can be substituted for the light-diffusing panel of the previously described implementation in order to achieve other desired illumination conditions. In some examples, the light conduit 115 may comprise one or more fiber optic cables, a series of enclosed mirrors, a lens, a device consisting of a combination of optical components, and/or the like. As a further example, the light conduit 115 may comprise a light diffusing panel curved in such a way as to partially surround a cylindrical display chamber 110 and thereby illuminate the contents of the display chamber 110 from a range of directions, as shown in FIG. 14. It may still have a frosted area 1310 to provide diffuse illumination to the display chamber.

Figure 16:
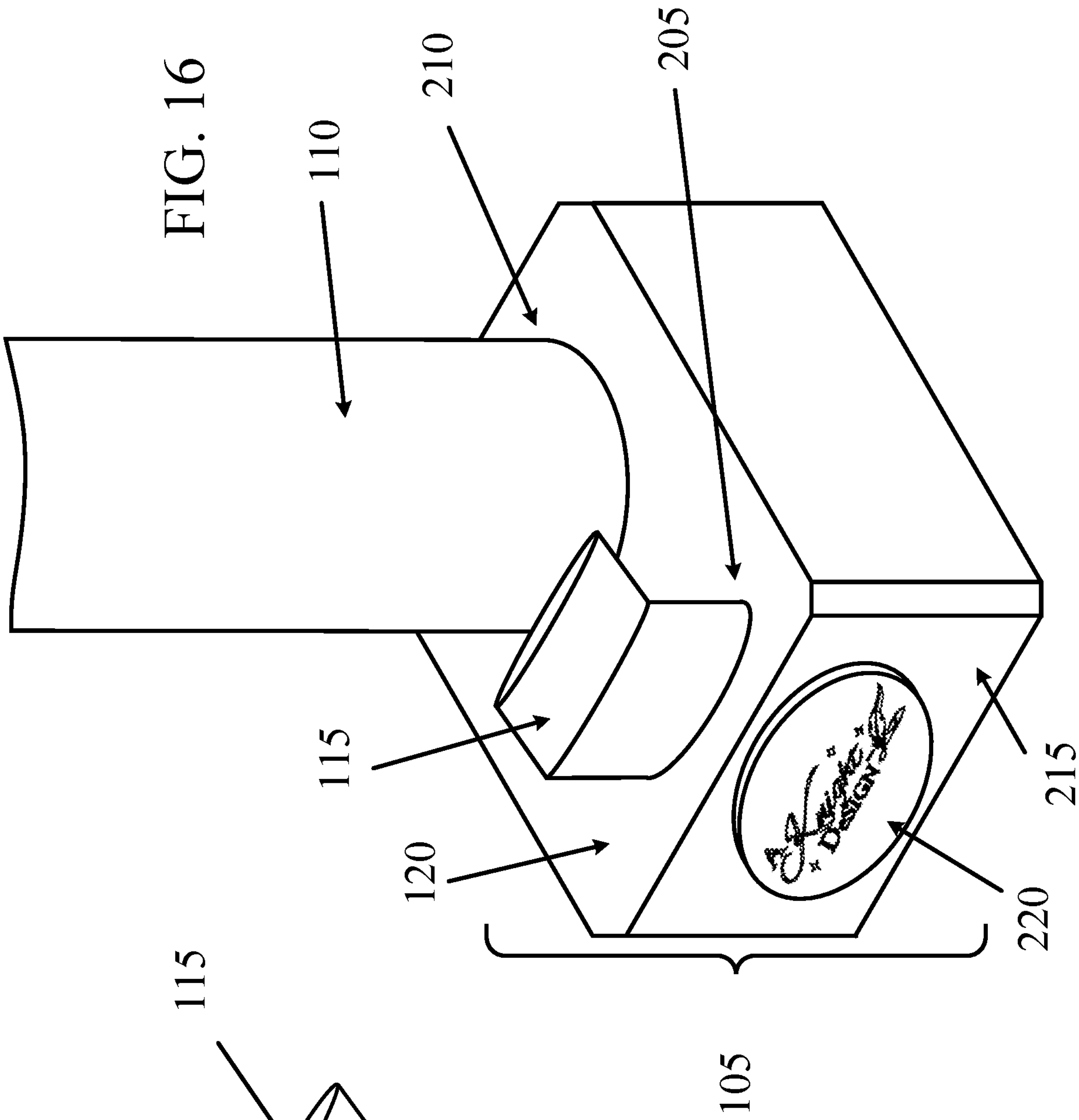
FIG. 16 is a partial perspective drawing of an assembled display platform including a base unit, cylindrical display chamber and light conduit comprising a bent light pipe, according to some embodiments disclosed herein.
Figure 15:
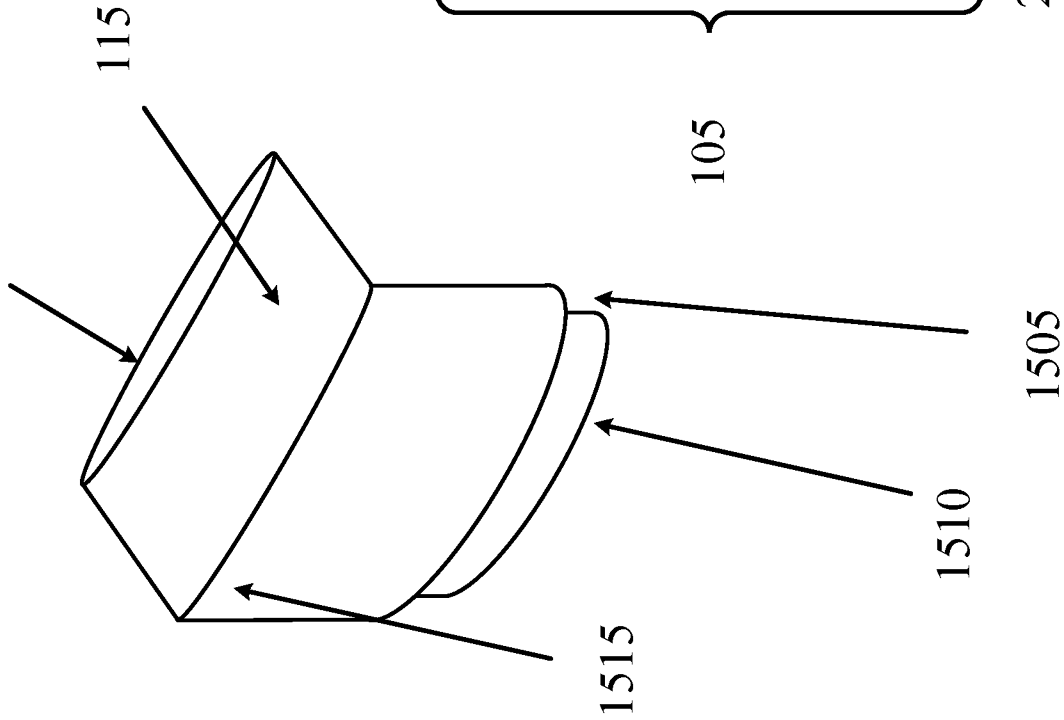
FIG. 15 is a perspective drawing of a light conduit comprising a bent light pipe with an oval cross section, according to some embodiments disclosed herein.

FIG. 15 depicts a light conduit 115 in the form of a bent light pipe, shown in one implementation with an oval cross-sectional shape. Such a light pipe may alternatively be provided in various other, different shapes, including but not limited to circular, square, rectangular, triangular, and/or the like. In the illustrated implementation, the light pipe has an oval base 1505 with a smaller oval tongue 1510, a bend 1515, and another oval face 1520 directed at an upward angle. The oval tongue 1510 may be configured to be inserted into the base unit 105 through an oval opening 205 positioned in front of the display chamber stage 210 on the base unit 105, such that the oval face 1520 is directed upward and toward the display chamber 110 and thereby may direct light from inside the base unit 105 to illuminate the display chamber 110 when the display platform 100 is assembled, as shown in FIG. 16. The oval face 1520 may be frosted in one implementation to provide more diffuse illumination to the display chamber. In alternative implementations, the light pipe may take other shapes, such as having a circular or rectangular base, flaring horizontally and/or vertically, having a rounded curve instead of an angular bend 1515, as well as other variations. In various implementations, similar light pipes may be arranged to illuminate a display chamber 110 from other angles, for example from one or both sides, diagonally from the front or back, and/or the like.

Figure 17:
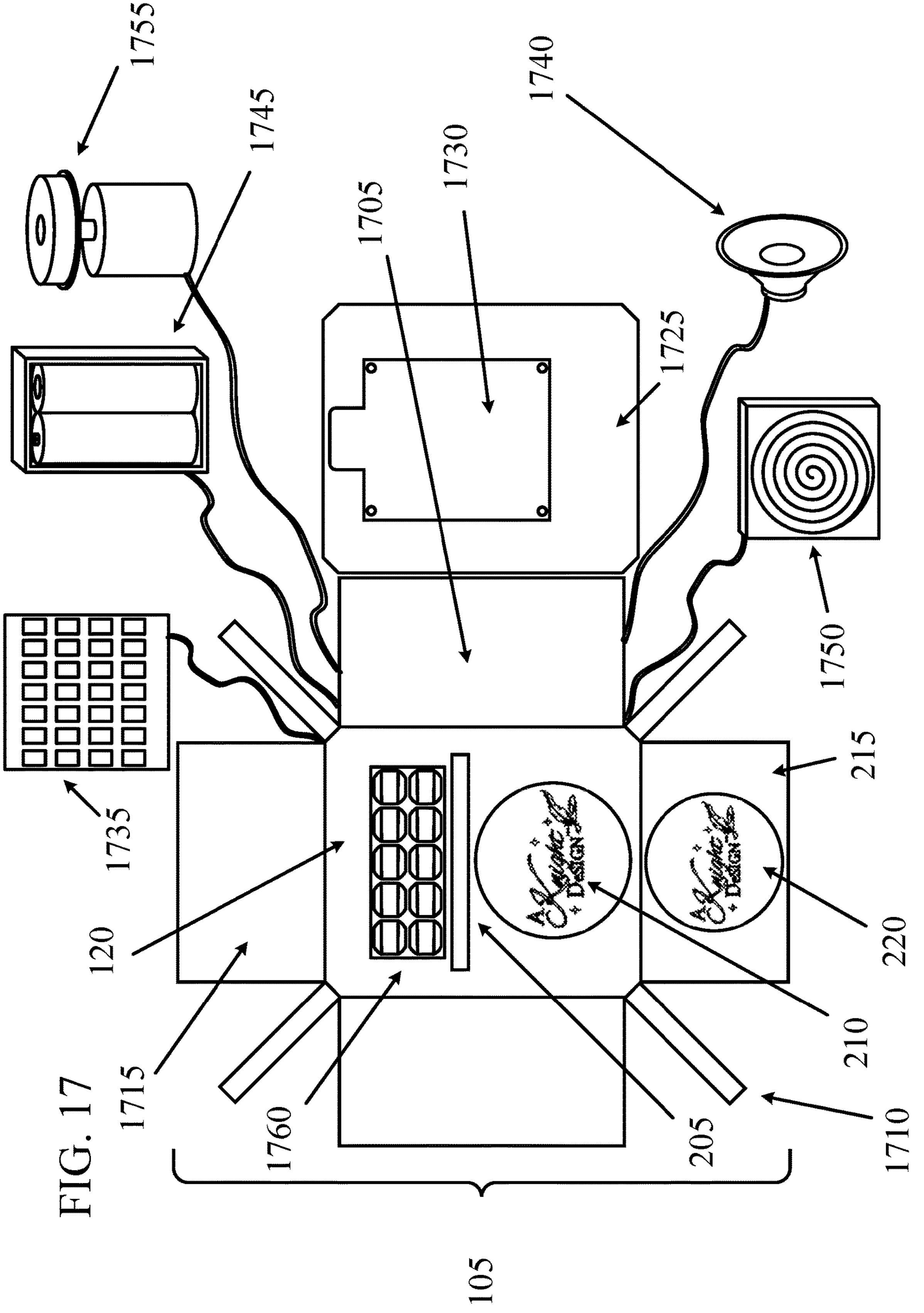
FIG. 17 depicts a base unit unfolded to show constituent panels and showing additional components that may be contained in the base unit, according to some embodiments disclosed herein.

FIG. 17 depicts abase unit 105 unfolded into constituent panels. In this embodiment, the base unit has two side panels 1705 and four corner panels 1710, as well as a rear panel 1715. The base unit 105 may contain a light source 1735, depicted in FIGS. 17 and 18 as a panel of light emitting diodes, though other light sources 1735 may be used in alternative implementations. FIG. 17 also depicts additional components that may be included in the base unit 105 according to some embodiments. For example, in some embodiments the base unit 105 may contain batteries 1740, which may power the light source 1735, and/or other electrical elements. In some embodiments, these batteries 1740 may be rechargeable. In some embodiments the base unit 105 may include photovoltaic cells 1760. Such photovoltaic cells 1760 may provide power directly to the light source 1735 and/or other electrical elements, and/or may charge batteries 1740 contained in the base unit 105. In some embodiments the base unit 105 may contain a speaker 1740, which may be configured to play music or other sounds. In some embodiments the base unit 105 may contain an induction coil 1750 or other induction element, which may be positioned beneath the display chamber stage 210 and be configured to provide wireless power to the display chamber 110. In some embodiments the base unit 105 may contain a magnet 1755 mounted on an electric motor, which may provide a magnetic field to rotate a magnetic stir bar 910. In some embodiments, the bottom panel 1725 includes a removable panel 1730 that allows access to the interior of the base unit 105 including at least to the light source 1735 contained within. In alternative embodiments, the base unit 105 may comprise a different number and arrangement of constituent panels to accommodate different folded configurations (e.g., cylindrical, octagonal, hexagonal, pentagonal, non-regular geometric shapes, and/or the like).

Figure 18:
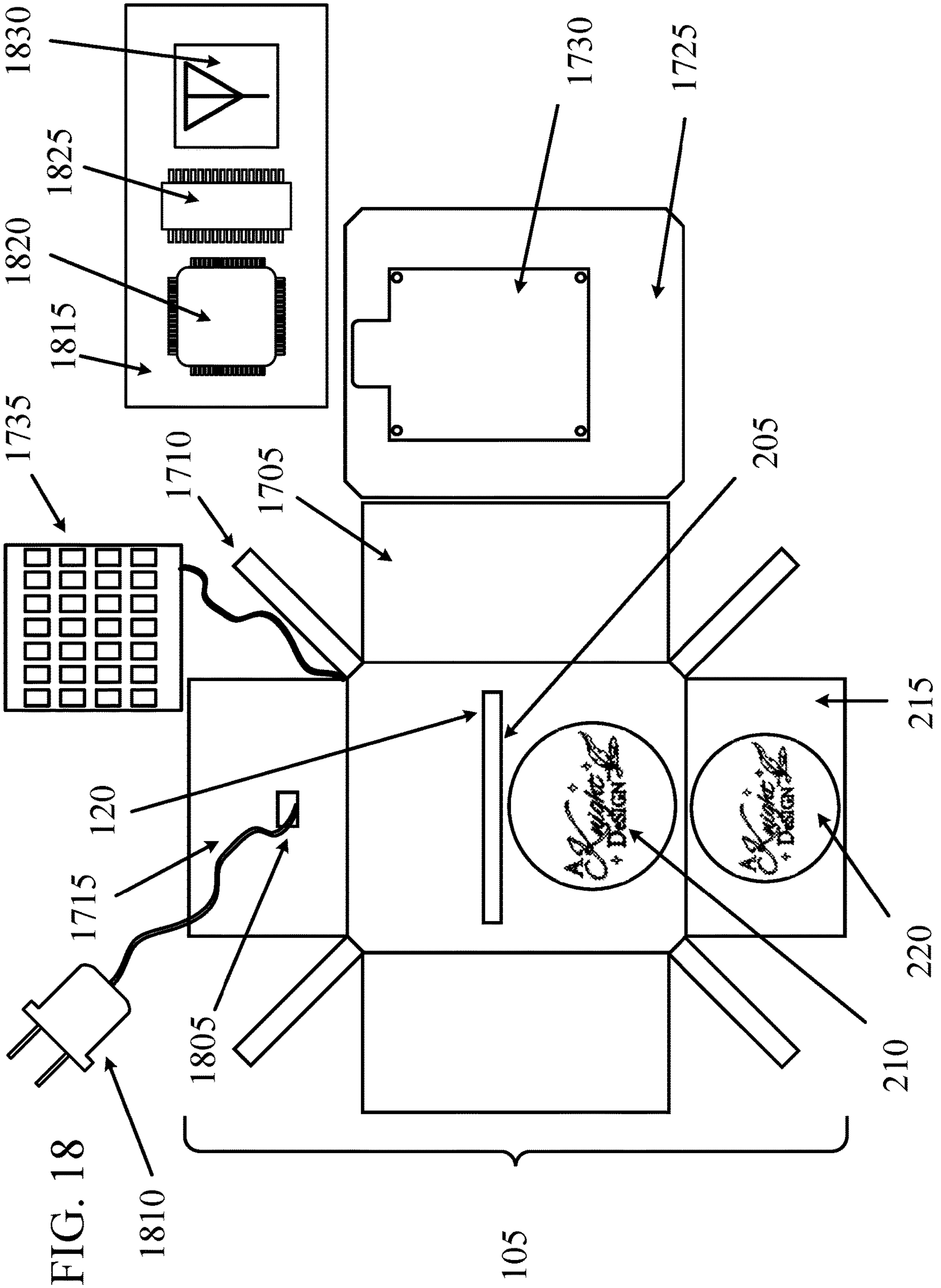
FIG. 18 depicts a base unit unfolded to show constituent panels and showing other additional components that may be contained in the base unit, according to some embodiments disclosed herein.

FIG. 18 depicts a base unit 105 unfolded into constituent panels according to other embodiments. In the depicted embodiment, the rear panel 1715 has an opening 1805 through which a power cable 1810 passes. This power cable 1810 may power a light source 1735 and/or other electrical elements when inserted into a power outlet. The light source 1735 and/or other electrical elements may be configured to draw power exclusively from the power cable 1810 without any battery, or the light source 1735 and/or other electrical elements may also or alternatively be configured to draw power from a battery 1740, e.g., when no power is provided by the power cable 1810. The battery 1740 may be rechargeable and the power cable 1810 may also be configured to recharge the rechargeable battery 1740, which battery may be configured to provide power to the light source 1735 and/or other electrical elements even when no power is provided by the power cable 1810. In other embodiments, the light source 1735 may be configured to produce light in a different manner, allowing a rear opening 1805 and cable 1810 to be excluded, such as exclusively by battery power for example, by using a nonelectric light source 1735, and/or the like. In some embodiments the base unit 105 may contain a printed circuit board 1815. In some embodiments the printed circuit board 1815 may include a microcontroller 1820. In some embodiments the printed circuit board 1815 may include memory 1825, which may be programmable memory. Such a memory may, in some implementations, include stored images that may be presented in the display chamber, such as by projection onto a screen provided within the display chamber via a projector in or on the base unit. In some embodiments the printed circuit board 1815 may include an antenna 1830. Such electronic components may be configured to provide a wide variety of features. For example, the microcontroller 1820 may be configured to control the light source 1735 and other functions. The microcontroller 1820 may be configured to turn the light source 1735 on and off, dim the light source 1735, direct the light source 1735 to emit different colors, flash, strobe, and/or the like. The microcontroller 1820 may be connected to an antenna 1830 and may be configured to receive commands sent by a mobile device, remote control, external and/or remote computer, and/or other source. The microcontroller 1820 may be connected to programmable memory 1825 and configured to store instructions for later execution therein.

By way of further example, in some implementations, the Novelty Display Platform may include a computer systemization such as may comprise a clock, a controller, a memory (e.g., a read only memory (ROM), a random access memory (RAM), and/or the like), and/or an interface bus, which may be interconnected and/or communicating through a system bus on one or more (mother)board(s) having conductive and/or otherwise transportive circuit pathways through which instructions (e.g., binary encoded signals) may travel to effectuate communications, operations, storage, and/or the like. The computer systemization may be connected to a power source, e.g., that is external and/or internal. The controller may serve to aggregate, processes, store, serve, identify, instruct, generate, match, and/or facilitate interactions with a user and/or computer, provide for programming of Novelty Display Platform components, and/or the like. The controller may include one or more processors, such as a central processing unit (CPU), microprocessor, microcontroller, and/or the like. In some implementations, the processor may comprise at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, and/or the like), RAM, and/or the like. The processor may access this memory through the use of a memory address space that is accessible via instruction address, which the processor can construct and decode allowing it to access a circuit path to a specific memory address space having a memory state. The processor may be a microprocessor such as: AMD's. Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (e.g., program code) according to conventional data processing techniques. Such instruction passing facilitates communication within the controller and beyond through various interfaces.

Any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller and/or a computer systemization may employ various forms of memory. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW and/or the like); an array of devices (e.g., Redundant Array of Independent Disks (RAID)); solid state memory devices (USB memory, solid state drives (SSD), and/or the like); other processor-readable storage mediums; and/or other devices of the like.

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. The interface bus provides for the communications of interface adapters with one another as well as with other components of the computer systemization. Interface adapters are adapted for a compatible interface bus. Interface adapters may connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA (PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the IDAP controller is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers, architectures may similarly be employed to pool, load balance, and/or otherwise increase the communicative bandwidth required by the controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, and/or the like); and/or the like.

User input devices may constitute one type of peripheral device and may include: card readers, dongles, finger print readers, gloves, graphics tablets, joysticks, keyboards, microphones, mouse (mice), remote controls, retina readers, touch screens (e.g., capacitive, resistive, and/or the like), trackballs, trackpads, sensors (e.g., accelerometers, ambient light, GPS, gyroscopes, proximity, and/or the like), styluses, and/or the like.

Peripheral devices may be connected and/or communicate to I/O and/or other facilities of the like such as network interfaces, storage interfaces, directly to the interface bus, system bus, the CPU, and/or the like. Peripheral devices may be external, internal and/or part of the IDAP controller. Peripheral devices may include: antenna, audio devices (e.g., line-in, line-out, microphone input, speakers, and/or the like), cameras (e.g., still, video, webcam, and/or the like), dongles (e.g., for copy protection, ensuring secure transactions with a digital signature, and/or the like), external processors (e.g., for added capabilities), network interfaces, storage devices, transceivers (e.g., cellular, GPS, and/or the like), and/or the like.

It should be noted that although user input devices and peripheral devices may be employed, the controller may be embodied as an embedded, dedicated, and/or monitor-less (e.g., headless) device, wherein access would be provided over a network interface connection.

In order to address various issues and advance the art, the entirety of this application for a Novelty Display Platform (including the Cover Page, Title, Headings, Field, Background, Summary, Brief Description of the Drawings, Detailed Description, Claims, Abstract, Figures, Appendices, and/or otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any components and/or any present feature sets as described in the figures and/or throughout are not limited to a fixed order and/or arrangement, but rather, any disclosed order is exemplary and all equivalents, regardless of order, are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. An apparatus, comprising:

a base unit having a front and a back including
  a light source enclosed within the base unit,
  an opening at a top side of the base unit,
  a display chamber stage adjacent to the opening, and
  a tube and a pump configured to push air through the tube and a first one-way valve into a removable display chamber;

the removable display chamber,
  wherein the removable display chamber further comprises the first one-way valve positioned in the bottom of the removable display chamber and a second one way valve positioned in the top of the removable display chamber, and
  wherein the first one-way valve is configured to couple with the tube in the display chamber stage;

wherein the display chamber stage is configured to accommodate the removable display chamber, and wherein the opening is configured to accommodate a light conduit for directing light from the light source to illuminate the removable display chamber.

2. The apparatus of claim 1, wherein the removable display chamber includes an opening substantially the same width as the removable display chamber at its widest point.

3. The apparatus of claim 1, wherein the removable display chamber further comprises a first one-way valve positioned in the bottom of the removable display chamber and a second one way valve positioned in the top of the removable display chamber, and wherein the first one-way valve is configured to couple with a tube in the display chamber stage, and the base unit further comprising the tube and a pump configured to push air through the tube and the first one-way valve into the removable display chamber.

4. The apparatus of claim 1, wherein the removable display chamber includes at least one opening at its top and at least one more opening at its bottom.

5. The apparatus of claim 1, wherein the removable display chamber further comprises a shelf on at least one of its inner surfaces.

6. The apparatus of claim 5, further comprising an ornamental sheet, wherein the shelf is configured to support the ornamental sheet above a bottom of the removable display chamber.

7. The apparatus of claim 1, further comprising:

a magnetic stir bar contained within the removable display chamber.

8. The apparatus of claim 1, further comprising:

a turbine attached to an inner surface of the removable display chamber.

9. The apparatus of claim 1, further comprising:

a turntable contained within the removable display chamber.

10. An apparatus, comprising:

a base unit having a front and back including a light source enclosed within the base unit, an opening at a top side of the base unit, and a display chamber stage spaced apart from the opening;

a light conduit, comprising a light-diffusing panel that is curved through a horizontal plane;

wherein the display chamber stage is configured to accommodate a display chamber, and wherein the opening is configured to accommodate the light conduit for directing light from the light source to illuminate the display chamber.

11. The apparatus of claim 10, further comprising:

a rotating platform on the base unit, wherein the rotating platform comprises at least a portion of the display chamber stage.

12. The apparatus of claim 10, wherein the base unit further comprises a speaker.

13. The apparatus of claim 10 further comprising:

a battery in the base unit configured to provide power at least to the light source.

14. The apparatus of claim 10, further comprising:

an inductive charging element positioned under the display chamber stage.

15. The apparatus of claim 10 further comprising:

an electric cable running into the base unit and configured to provide power at least to the light source.

16. The apparatus of claim 10 wherein the base unit further comprises a microcontroller configured to control at least the light source.

17. The apparatus of claim 16 wherein the microcontroller is connected to an antenna and configured to receive commands sent by a mobile device.

18. The apparatus of claim 16 further comprising:

programmable memory coupled to the microcontroller, wherein the programmable memory is configured to store instructions for later execution by the microcontroller.

19. An apparatus, comprising:

a base unit having a front and back including a light source enclosed within the base unit, an opening at a top side of the base unit, and a display chamber stage spaced apart from the opening;

a light conduit, comprising a bent light pipe configured to redirect light entering at one end from the light source to the other end of the bent light pipe;

wherein the display chamber stage is configured to accommodate a display chamber, and wherein the opening is configured to accommodate the light conduit for directing light from the light source to illuminate the display chamber.

* * * * *